HENRY HERBERT.

Improvement in Pipe-Tongs.

No. 4,917. Reissued May 28, 1872.

H. Herbert

INVENTOR.

By Knight Bros.

Attys.

Attest.

Jas. H. Layman.

John Kilbon.

AM. PHOTO-LITHOGRAPHIC CO. N.Y. (OSBORNE'S PROCESS.)

UNITED STATES PATENT OFFICE.

HENRY HERBERT, OF CINCINNATI, OHIO.

IMPROVEMENT IN PIPE-TONGS.

Specification forming part of Letters Patent No. 45,496, dated December 20, 1864; reissue No. 4,917, dated May 28, 1872.

*To all whom it may concern:*

Be it known that I, HENRY HERBERT, of Cincinnati, Hamilton county, Ohio, have invented a new and useful Improvement in Pipe-Wrenches; and I do hereby declare the following to be a full, clear, and exact description thereof, reference being had to the accompanying drawing making part of this specification—

My improvement relates to devices whereby a pipe-fitter's tongs or wrench is made more efficient and comprehensive than heretofore; the invention being more particularly designed for the use of the gas-fitter.

Figure 1:
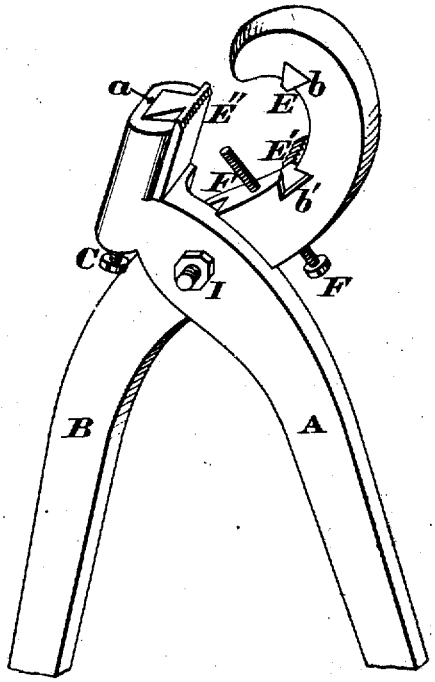
Figure 2:
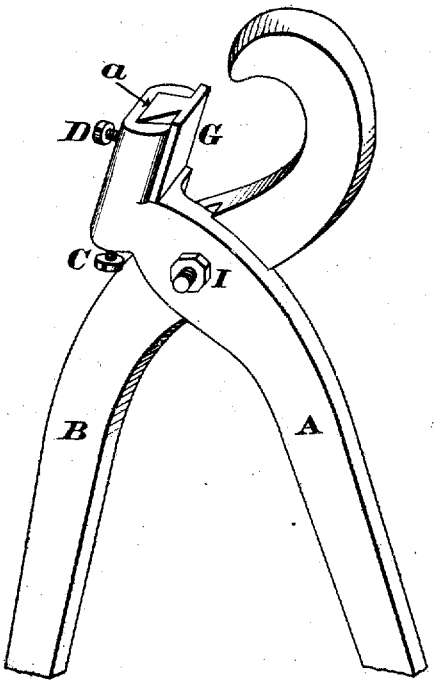
Figure 3:
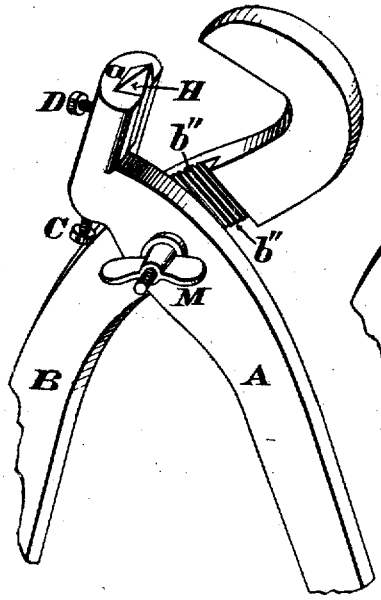
Figure 4:
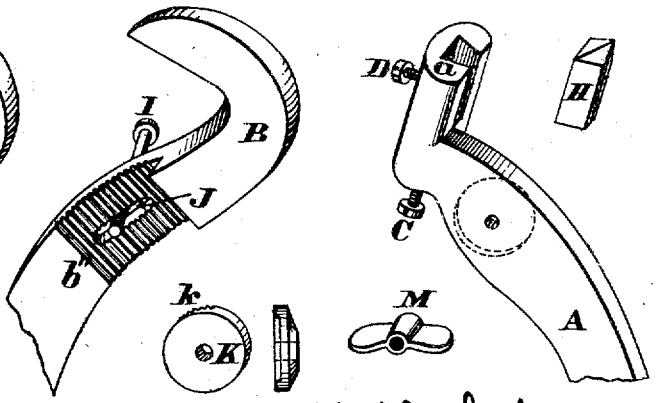

Figure 1 represents a pair of tongs, adapted to chase or cut a screw-threaded pipe. Fig. 2 represents a pair of tongs rigged as a screw-wrench. Fig. 3 represents the same, adapted for securely cutting or griping a pipe or for cutting a groove around a pipe for the purpose of severing it. Fig. 4 represents a device whereby the tongs may be adapted to operate on work of diverse diameters.

A B represent the two jaws of a gas-fitter's pipe-tongs. The jaw A has a dovetailed socket, *a*, for the reception of the various teeth or bits needed by pipe-fitters. The jaw A is also furnished with an adjusting-screw, C, to enable the operator to set the bit out or in, as may be required. D is a set-screw, to secure the bit to the place of adjustment. The counter-jaw B has the customary hooked form, to enable it to grasp the pipe on the side opposite to that on which the jaw A engages. One or both jaws are armed with one or more removable bits or teeth of hard steel, which bits project slightly from the face of the jaw, and occupy dovetailed sockets *a b b′* therein. It is manifest that the transverse dovetail slots *b b′* constitute an efficient means of holding bits with any form of external face. The jaw B is traversed by a screw-threaded gauge, F, which, when its point rests in contact with the inner face of the die E″, limits the closure of the jaws to correspond with the diameter of the pipe which is being operated upon. When required for use as a simple pipe-wrench a tooth or pin, E or G, is made to occupy the socket *b* or *a*. The tooth E may project only an eighth of an inch to a thirty-second of an inch above the jaw-face, which, as soon as the pipe touches it prevents further indentation, and thus preserves the pipe from being crushed in case a crushing power is applied. H is a graver-pin or tooth, by means of which the operator is enabled to cut around the pipe by a rapid motion of the tool, as a preliminary to severing the pipe at that part. The bits or teeth E″ G H may be used instead of and in the place of one another, and may come to a point, as in Fig. 3, to a knife-edge, as in Fig. 2, or a serrated edge as in Fig. 1.

I adapt my tongs for diverse sizes of pipe by causing the pivot I to occupy a longitudinal slot, J, in the jaw B, transverse corrugations *b″*, on the said jaw fitting similar corrugations, *k*, on the face of a washer, K, which is finally secured in any place desired by means of the nut M upon the screw-threaded extremity of the pivot I. The inner side of the jaw A is recessed, (see dotted lines in Fig. 4,) to receive the washer K.

I am aware that a wrench has before been constructed to receive changeable bits, as described in William Webster's patent of February 9, 1864, and, also, that it is not new to construct pipe-tongs with the pivot working in a slot to adapt them to be adjusted for different sizes of pipe. I am also aware that one or both operating surfaces of a pipe-wrench have been made detachable, but such surfaces have either not possessed the effective grip of a simple point or knife edge, or have been costly and impracticable in their mode of attachment. None of them, so far as known to me, have presented the features of a small bit or tooth, capable of being supplied at low cost and in large numbers, of uniform size, shape, and hardness, so as, when worn or broken, to be easily and cheaply replaced, without the labor of fitting them to their sockets.

My bit or tooth, being a small piece of cast-steel, can be swaged in a suitable die, and be duplicated of precisely uniform shape, size, and hardness, in large numbers, at a small expense.

Having thus described my invention, I claim and desire to secure by Letters Patent—

1. The removable tooth or bit E, adapted to fit a transverse dovetail slot in one jaw of the tongs, substantially as described.

2. As a new article of manufacture, the adjustable pipe-tongs, hereinbefore described, provided with the slot J, pivot I, nut M, corrugated washer K *k*, corrugations *b''*, and dovetail sockets *a b b'*, all as specified.

In testimony of which invention I hereunto set my hand.

HENRY HERBERT.

Witnesses:
GEO. H. KNIGHT,
JAMES H. LAYMAN.